Dec. 13, 1966    G. DE COYE DE CASTELET    3,290,766
ASSEMBLY MACHINE WITH SWIVELLING TABLE

Filed May 19, 1965    4 Sheets-Sheet 2

Inventor
GAËTAN de COYE de CASTELET
Stevens, Davis, Miller & Mosher
Attorneys

Dec. 13, 1966 G. DE COYE DE CASTELET 3,290,766
ASSEMBLY MACHINE WITH SWIVELLING TABLE
Filed May 19, 1965 4 Sheets-Sheet 3

Inventor
GAÉTAN deCOYE deCASTELET
Stevens, Davis, Miller & Mosher
Attorneys

Dec. 13, 1966  G. DE COYE DE CASTELET  3,290,766
ASSEMBLY MACHINE WITH SWIVELLING TABLE
Filed May 19, 1965  4 Sheets-Sheet 4
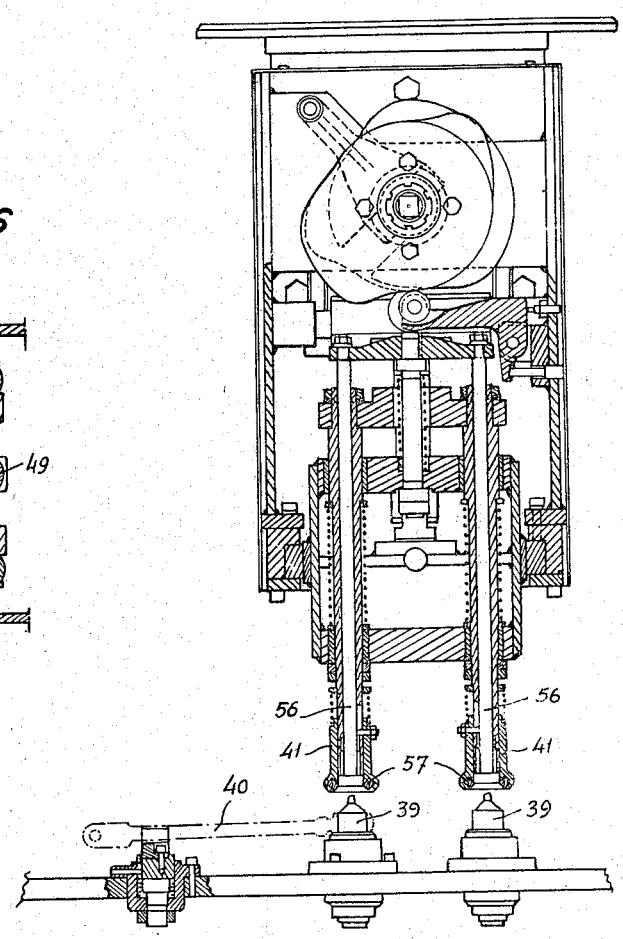
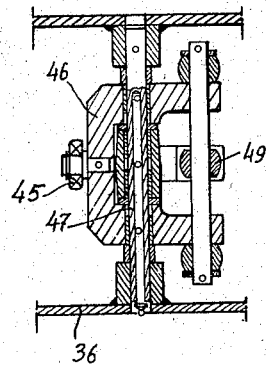
Inventor
GAËTAN de COYE de CASTELET
Stevens, Davis, Miller & Mosher
Attorneys

United States Patent Office 3,290,766
Patented Dec. 13, 1966

3,290,766
ASSEMBLY MACHINE WITH SWIVELLING TABLE
Gaëtan de Coye de Castelet, Billancourt, France, assignor to Regie Nationale des Usines Renault, Billancourt, France, a French works
Filed May 19, 1965, Ser. No. 457,106
Claims priority, application France, May 22, 1964, 975,592, Patent 1,404,646
2 Claims. (Cl. 29—208)

Numerous assembly operations can be carried out automatically on a machine; on the other hand, such operations, which are intrinsically very different from one another, require a special installation in each case and therefore call for the design of a special machine for each operation.

This invention aims at overcoming this costraint and accordingly relates to a machine enabling a multiplicity of different assembly operations to be performed using a common basic unit capable of receiving interchangeable components adapted to each individual operation to be performed, said components in turn comprising the greatest possible number of common parts such as stands, carriages, shafts, slideways, levers, and so forth.

The invention is further characterized by the fact, unless impossible, the various working elements of the machine are actuated by cams in accordance with a pre-established cycle, thereby avoiding the use of the costly electrical or pneumatic switchgear that would be required by a sequential cycle.

Thus, these various features jointly enable assembly machines to be devised at a cost price which is markedly lower than that of special electropneumatically controlled machines, while the use of mechanical control endows them with remarkable robustness and reliability.

The subject machine of the present invention will now be more particularly described with reference to the accompanying non-limitative exemplary drawings, in which:

FIGURE 5 is a sectional view of said interchangeable component, taken through the line V—V of FIGURE 4; and FIGURE 6 is a partial section taken through the line VI—VI of FIGURE 4.

Figure 1:
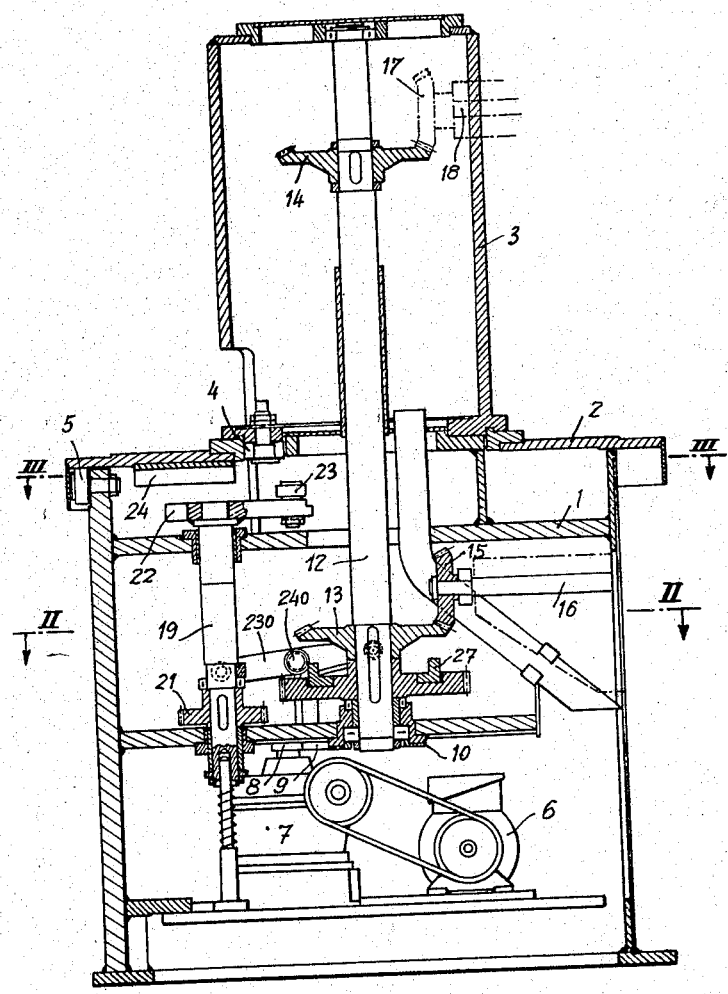
FIGURE 1 is a sectional elevation, on the line I—I of FIGURE 2, of the basic machine unit.
Figure 2:
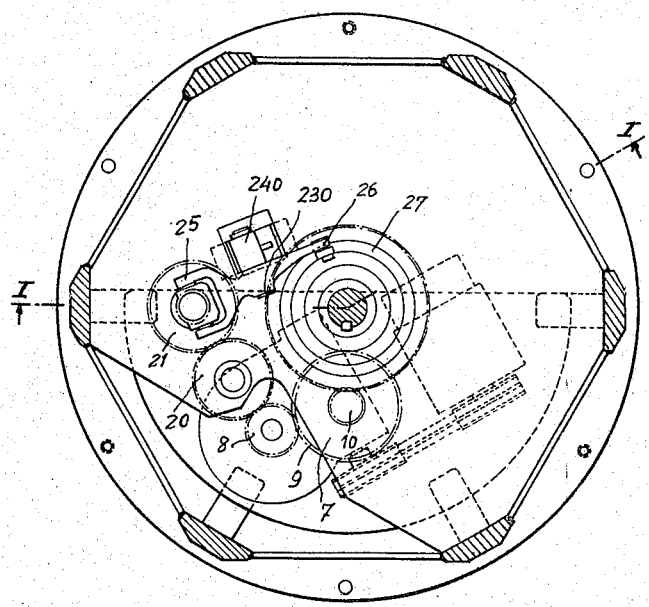
FIGURE 2 is a cross-sectional plan view of said unit on the line II—II of FIGURE 1.
Figure 3:
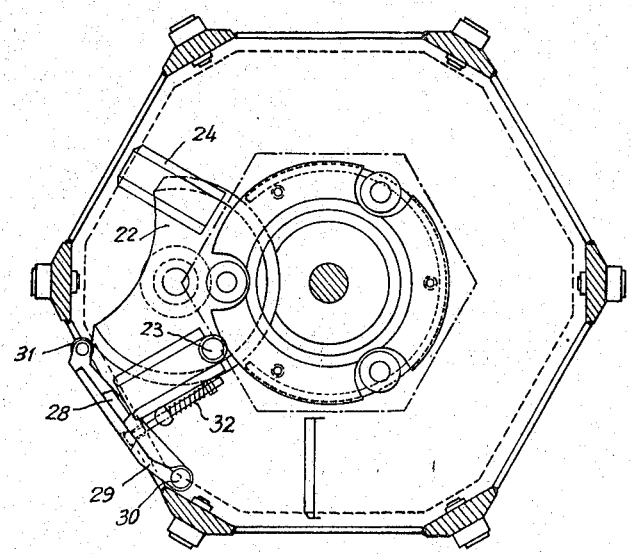
FIGURE 3 is a further cross-sectional plan view of said unit on the line III—III of FIGURE 1.

The basic machine unit shown in FIGURES 1, 2 and 3 comprises a hexagonal stand 1, a swivelling table 2 with a central aperture therein, a fixed hexagonal turret 3 and a drive mechanism mounted within the stand and the turret.

The stand 1 may, though not necessarily, be formed of welded members. In the drawings it is shown as being of hexagonal shape, but it could be of polygonal shape with a number of sides other than six, without departing from the scope of the invention.

The swivelling table 2 is positively centered by anti-friction bearing 4 fixed to the turret 3 and is supported in anti-friction bearings 5 fixed to the stand 1.

The turret 3 is fixed and positively centered on the upper part of the stand 1. It is shaped as a polygon having the same number of sides as the stand and, like the latter, may be composed of welded members.

The drive mechanism positioned within the stand and the turret comprises an electric motor 6 which, through the medium of a reduction gear 7 and a train of pinions 8, 9 and 10, drives a vertical central shaft 12.

All the motions of the working components of the machine are taken off this central shaft.

The latter accordingly carries two bevel gears 13 and 14. The bevel gear 13, which is mounted on the lower end of the shaft 12, i.e. inside the stand 1, engages with bevel gears 15 mounted on the ends of shafts 16, each of which drives the mechanism of that working component which is mounted opposite the corresponding side of the polygon forming the stand 1. The bevel gear 14 is mounted on the upper end of the shaft 12 and, through bevel pinions 17 and shaft 18, drives the mechanisms of those working components which are mounted opposite the sides of the turret 3.

The swivel motion of the table 2 is likewise obtained from the electric motor 6 and the reduction gear 7, through the agency of the mechanism described hereinbelow. The reduction gear drives a lateral shaft 19 through pinions 20 and 21. At its upper end the lateral shaft 19 supports a plate 22 bearing a driving peg 23 which, as the plate rotates, engages with the grooves 24 of a Geneva gear associated to the swivelling table.

It will readily be understood that each engagement of the peg in a groove corresponds to a rotation of one-sixth of a revolution of the table (it being of course understood that the mechanism may be devised so as to impart $1/n$ of a revolution if the stand comprises $n$ sides).

The peg does not engage with the grooves 24 at each revolution of plate 22 but only every $x$ revolutions, $x$ being chosen by modification of the gear ratios whereby to provide sufficient time for execution of the work phase to be performed between two consecutive swivellings of the table.

The lateral shaft 19 is accordingly adapted to be slidable vertically. Its vertical reciprocating motion is imparted to it by the lever 230 which is pivotally connected to a fixed point 240 on the stand, and the end 25 of this lever is fork-shaped and engages in a groove formed on said shaft, its other end 26 being actuated by a cam 27 supported by the central shaft 12 of the machine. The swivelling table is held stationary in position by a dog 28 which engages in that groove of the Geneva gear which is halted opposite said dog. The arresting mechanism comprises a lever 29 which is pivotally connected to a fixed point 30 on the stand and the other end of which is equipped with a follower 31 which rides over the cam-like contour of the plate 22.

The lever 29 is urged into the engaging position by the return spring 32.

Onto the basic machine unit described in detail hereinabove are mounted the interchangeable components adapted to the several special operations which the machine is to perform.

Figure 4:
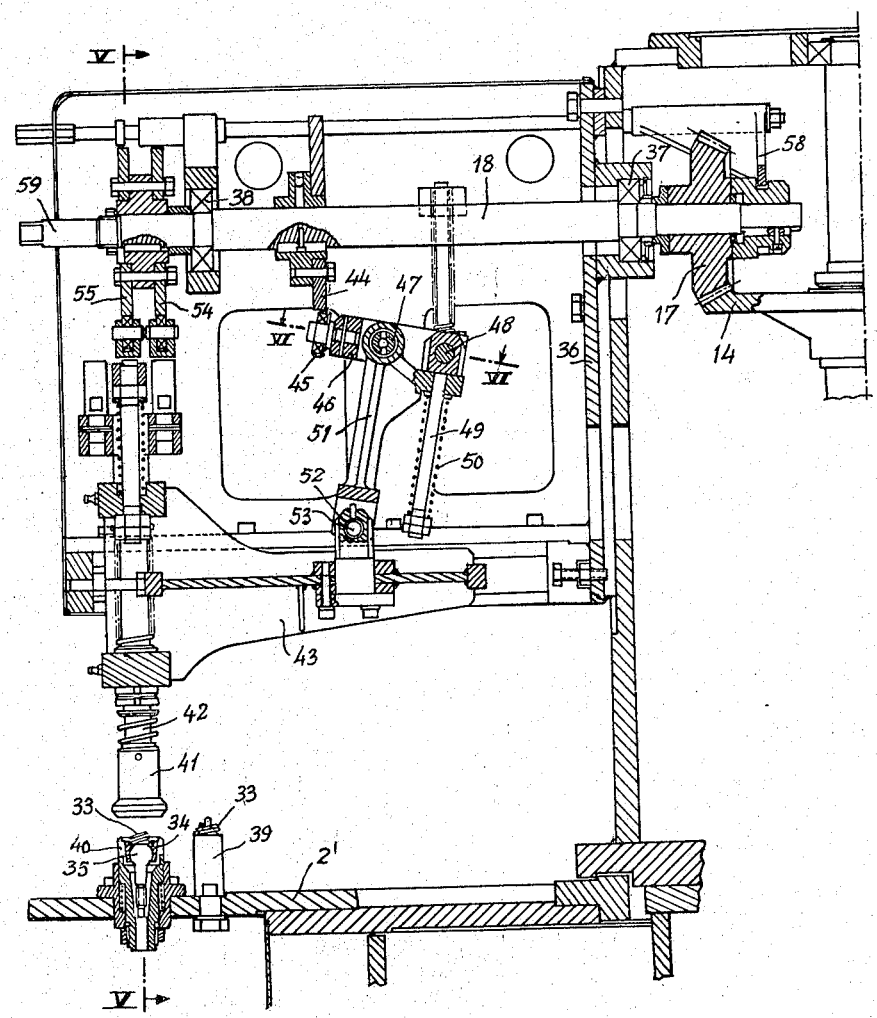
FIGURE 4 is a cross-sectional view of an interchangeable working component, taken through a vertical plane passing through its centreline.

Firstly, onto the swivelling table 2 is fixed a ring 2' of a diameter suitable for the size and proper retention of the parts to be assembled (see FIGURE 4).

Secondly, each face of the turret is adapted to receive a working head carrying the necessary tools and members for gripping, displacing and depositing the parts or materials to be used. Similarly, each face of the stand except one (before which the operator stands if the machine is not fully automatic) is adapted to receive a bracket of similar design to that of the heads but operating upwardly instead of downwardly.

An interchangeable working component adapted to a specific operation will now be more particularly described by way of example.

Reference is had to FIGURES 4, 5 and 6 for an illustration of such a component, which is adapted to be fixed to one of the sides of the turret 3 and forms part of the equipment of a machine for assembling the ball-joints of track-rods on motor vehicles.

This machine station (the fourth) deals with the operation of positioning the spring 33 on such ball-joints after the properly orientated socket 34 and the ball 35 have been positioned in the housing on the rod 40 at machine stations 1, 2, and 3.

The working component is in this case a bracket 36 carrying in its upper part two bearings 37 and 38 in which is supported the horizontal shaft 18 which, as already stated, is driven off the stand central shaft 12 through the bevel wheels 14 and 17.

The cams actuating the various tools and working members are keyed onto the shaft 18.

After the spring 33 has been positioned on a suitable support 39, the operation involves gripping it and depositing it in the housing on the track-rod, the already assembled component parts of which are carried by the ring 2′ on an appropriate support.

A gripping head 41 is accordingly mounted on the end of a slidable vertical shaft 42 supported by a carriage 43.

The horizontal motion required to move the carriage 43 and hence the head 41 from a position above the support 39 to a position above the part is obtained through the agency of the cam 44. To that end, said cam is caused to coact with a follower 45 carried by a fork-shaped lever 46 pivotally connected to a fixed pin 47. Through the medium of a pin 48, a part 49 and a spring 50, the lever 46 actuates a bell-crank 51 which, through the agency of a yoke 52 connected to a pin 53 rigid with the carriage 43, in turn displaces the latter.

The vertical motions of the gripping head 41 are likewise obtained through cams 54 and 55 coacting with the end of the slidable vertical shaft 42.

In an initial phase, after the head 41 has been moved above the support 39, the cams 54 and 55 operate simultaneously and lower the head 41 and an internal pushrod 56 until the spring is covered, which spring is then attracted by a permanent magnet 57 on the head 41.

In a second phase, the compound 41–56 rises anew and moves above the track-rod.

In a third phase, the compound 41–56 descends and covers the head of the track-rod. At this stage the pushrod 56 remains stationary and the head 41 is raised, thereby causing the spring 33 to separate from the magnet 57. In the final phase the pushrod 56 is raised and reverts to the position shown in FIGURE 5. This completes the work cycle of this station.

The machine is devised so that the times required to perform the work cycles at the various stations are substantially equal, but in any event the longest cycle will determine the time interval between two consecutive swivellings of the table.

Since the cams rotate continuously it will be manifest that they must be contoured in such manner that the working members which must be in contact with the parts have their motions imparted to them only during the time intervals when the table is stationary, although it will be appreciated that certain preliminary operations independent of the parts to be assembled may be carried out with advantage during the swivelling motion of the table.

In order to enable all adjustments on the camshafts such as the camshaft 18 to be carried out with ease, the latter may be released by means of a conventional mechanism 58 positioned on the same end of the camshaft as the bevel gear 17, whereby the camshaft may be rotated manually from its other end 59 which is accordingly shaped with a square stub end.

In cases where a cam-type control, though perfectly suited by reason of its simplicity and precision to motions of limited amplitude not requiring large forces to be exerted, is not suitable, recourse may be had to working components comprising an independent electric motor or a hydraulic or pneumatic actuator which may be activated by either electric contacts or pneumatic valves, completion of the various motions in the required time interval being controlled by a small cam-type programming device placed in a so-called "electrical head." Even in this case, where the concept of sequential operation is reintroduced, the control circuit is highly simplified since the various information items are used solely for halting the central motor.

What is claimed is:
1. A device for performing sequential operations on a plurality of workpieces, said device comprising a multisided stand; a multisided turret fixedly mounted on said stand; a vertical drive shaft extending through said stand and said turret; drive means mounted in said stand; a first coupling means operatively coupling said drive means to said drive shaft; a plurality of first spaced gear members mounted on and driven by said drive shaft; a plurality of spaced auxiliary shafts rotatably mounted adjacent at least one side of at least one of said turret and stands; a second gear member mounted on each of said auxiliary shafts and operatively connected to a corresponding first gear member for imparting rotational movement to said auxiliary shafts; at least one workpiece engaging means detachably mounted adjacent at least one side of at least one of said turret and stand; cam and follower means respectively mounted on said auxiliary shafts and said workpiece engaging means for imparting horizontal and vertical movement to said workpiece engaging means; a workpiece carrier rotatably mounted between said stand and said turret; a second coupling means operatively coupling said carrier to said drive means to drive said carrier thereby presenting each workpiece to said workpiece engaging means; said cam and follower means and said second coupling means being arranged so as to permit each of said workpiece engaging means to perform a series of independent operations on each of the workpieces according to a predetermined sequence.

2. The device of claim 1 wherein said second coupling means comprises a releasable Geneva gear assembly connected to said workpiece carrier and means connecting said drive means to said gear assembly according to said sequence to intermittently rotate said carrier.

References Cited by the Examiner
UNITED STATES PATENTS

| | | | |
|---|---|---|---|
| 3,065,530 | 11/1962 | Merchant et al. | 29—208 X |
| 3,143,792 | 8/1964 | Swanson et al. | 29—208 |
| 3,231,968 | 2/1966 | Swanson | 29—208 |

JOHN F. CAMPBELL, *Primary Examiner.*

THOMAS H. EAGER, *Examiner.*